United States Patent
Jahme et al.

(10) Patent No.: US 10,160,416 B2
(45) Date of Patent: Dec. 25, 2018

(54) AIRBAG

(71) Applicant: Autoliv Development AB, Vårgårda (SE)

(72) Inventors: Bernhard Jahme, Stadtbergen (DE); Magdalena Kocjan, Wroclaw (PL); Piotr Burak, Wroclaw (PL)

(73) Assignee: AUTOLIV DEVELOPMENT AB, Vargarda (SE)

( * ) Notice: Subject to any disclaimer, the term of this patent is extended or adjusted under 35 U.S.C. 154(b) by 414 days.

(21) Appl. No.: 14/905,626

(22) PCT Filed: Jul. 17, 2014

(86) PCT No.: PCT/EP2014/065371
§ 371 (c)(1),
(2) Date: Jan. 15, 2016

(87) PCT Pub. No.: WO2015/007838
PCT Pub. Date: Jan. 22, 2015

(65) Prior Publication Data
US 2016/0152207 A1 Jun. 2, 2016

(30) Foreign Application Priority Data

Jul. 19, 2013 (DE) .................. 10 2013 012 017

(51) Int. Cl.
*B60R 21/231* (2011.01)
*B60R 21/233* (2006.01)
(Continued)

(52) U.S. Cl.
CPC ........ *B60R 21/2338* (2013.01); *B60R 21/231* (2013.01); *B60R 21/264* (2013.01);
(Continued)

(58) Field of Classification Search
CPC ...... B60R 21/2338; B60R 2021/23382; B60R 2021/23384
See application file for complete search history.

(56) References Cited

U.S. PATENT DOCUMENTS 5,607,183 A * 3/1997 Nishimura ............ B60R 21/233
280/743.1
6,257,618 B1 * 7/2001 Tschaschke .......... B60R 21/233
280/743.1

(Continued)

FOREIGN PATENT DOCUMENTS

DE 42 40 227 A1 3/1993
DE 202 13 651 U1 2/2003
(Continued)

OTHER PUBLICATIONS

PCT International Search Report—dated Aug. 27, 2014.
(Continued)

*Primary Examiner* — Ruth Ilan
(74) *Attorney, Agent, or Firm* — Brinks Gilson & Lione

(57) ABSTRACT

An airbag having a front side (10) and a rear side (20) connected thereto, which airbag is made of an airbag material, which encloses a volume that is filled with a deployment gas when a gas generator or a pressurized gas source is activated, and having at least one limiting strap (30), which is connected to the front side (10) at a first fastening point (31), and to the rear side (20) at a second fastening point (32. At least one of the fastening points (31, 32) has a fastening seam (51, 51', 52, 52') having mutually opposing sections for fastening the limiting strap (30) to the airbag material, and wherein at least one load relief slot (60) at the fastening point (31, 32) between the sections of the fastening seam (51, 51', 52, 52').

11 Claims, 5 Drawing Sheets

(51) Int. Cl.
  *B60R 21/2338* (2011.01)
  *B60R 21/264* (2006.01)
  *B60R 21/268* (2011.01)
  B60R 21/00 (2006.01)
  B60R 21/16 (2006.01)

(52) U.S. Cl.
  CPC ...... *B60R 21/268* (2013.01); *B60R 2021/003* (2013.01); *B60R 2021/161* (2013.01); *B60R 2021/23382* (2013.01); *B60R 2021/23384* (2013.01)

(56) References Cited

U.S. PATENT DOCUMENTS

| | | | |
|---|---|---|---|
| 9,211,864 B2 * | 12/2015 | Hock | B60R 21/2338 |
| 2014/0151989 A1 * | 6/2014 | Iwamoto | B60R 21/239 |
| | | | 280/743.2 |
| 2015/0042082 A1 * | 2/2015 | Koshikawa | B60R 21/203 |
| | | | 280/739 |

FOREIGN PATENT DOCUMENTS

| | | |
|---|---|---|
| DE | 102 23 189 A1 | 12/2003 |
| DE | 20 2004 006 655 U1 | 9/2004 |
| WO | WO-2009078212 A1 * | 6/2009 ......... B60R 21/2338 |

OTHER PUBLICATIONS

XP-000726772—Airbag Attachment Apparatus—Research Disclosure—Sep. 1997/581.
German Examination Report—dated Mar. 11, 2014.

\* cited by examiner

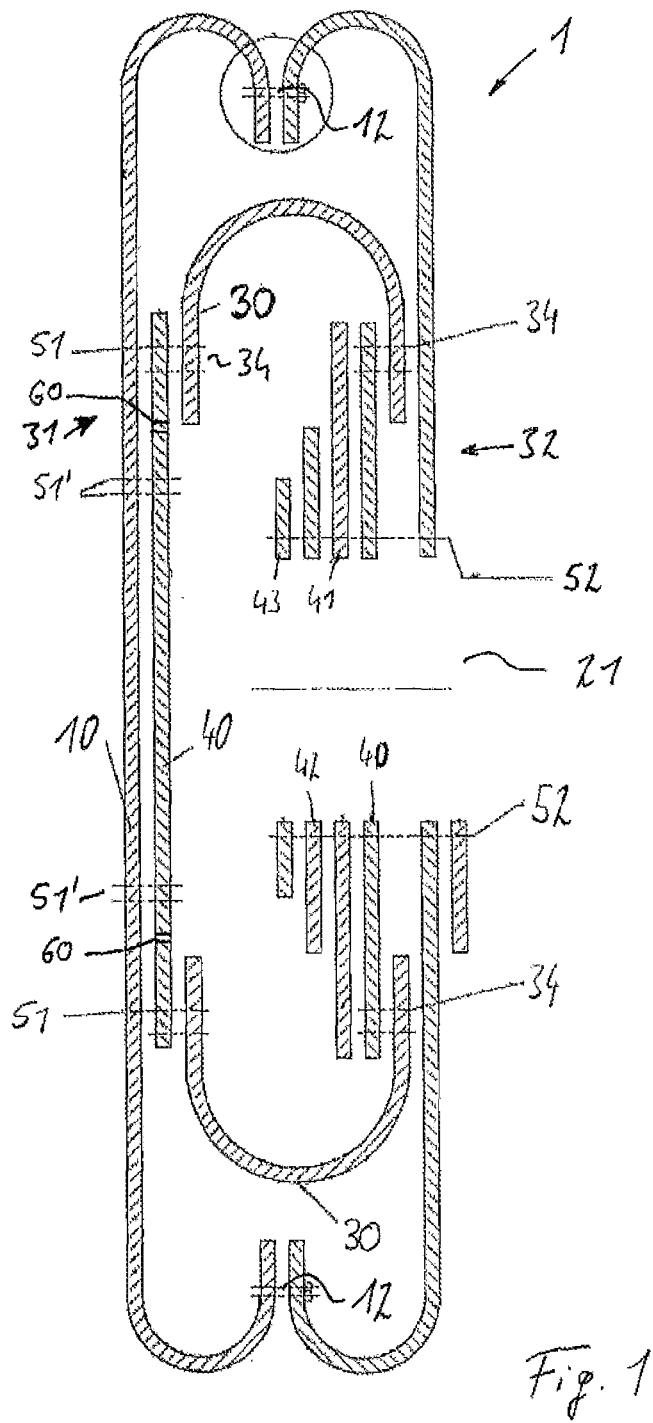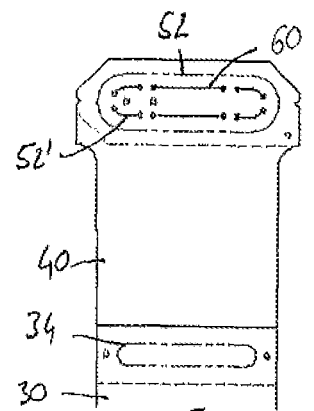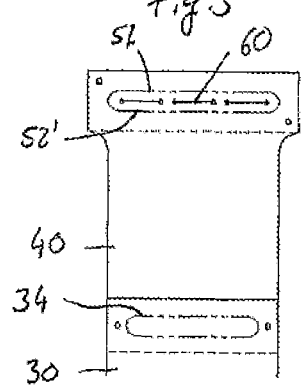
Fig. 1
Fig. 2
Fig. 3

AIRBAG

CROSS REFERENCE TO RELATED APPLICATIONS

This application claims priority to German Application No. 10 2013 012 017.9, filed on Jul. 19, 2013 and PCT/EP2014/065371, filed on Jul. 17, 2014.

FIELD OF THE INVENTION

The invention relates to an airbag having a front side and a rear side connected thereto, which airbag is made of an airbag material, which encloses a volume that is filled with deployment gas when a gas generator or pressurized-gas source is activated, and having at least one limiting strap, which is connected to the front side at a first fastening point, and to the rear side at a second fastening point.

Limiting straps in an airbag serve to limit the shape, and thus also the volume of the airbag in order to prevent said airbag from assuming an undesired shape during or after filling.

BACKGROUND

DE 42 40 227 B4 relates to a belt assembly for use in an inflatable airbag, as well as to a method for producing such an airbag. The limiting strap arrangement includes a plurality of limiting straps, which are affixed to a front part and a rear part of the airbag, and which hold said parts together. The belt assembly may have a central fastening region, from which two or a plurality of limiting straps extend. The central fastening region may have an annular shape, which serves as a reinforcement and fastening piece.

What is problematic in this type and manner of fastening is the fact that the fastening seams in the region of the connection to the airbag material can tear when the airbag is filled with a deployment gas.

The object of the present invention is to provide an airbag that makes possible greater durability in the fastening of the limiting straps to the wall of the airbag.

This object is achieved according to the invention by an airbag having the features as described herein.

SUMMARY

The airbag according to the invention, having a front side and a rear side connected thereto, which airbag is made of an airbag material, which encloses a volume that is filled with a deployment gas when a gas generator or a pressurized-gas source is activated, and having at least one limiting strap, which is connected to the front side at a first fastening point, and to the rear side at a second fastening point, said airbag providing that at least one fastening point has a fastening seam having mutually opposing sections for fastening the limiting strap to the airbag material, and that at least one load relief slot is incorporated at the fastening point between the sections of the fastening seam. By providing at least one load relief slot, it is possible to provide a greater degree of elasticity to the connection between the limiting strap and the airbag material in order to reduce the load on the fabric and on the fastening seam. As a result, it is possible to provide a connection that is more elastic than connections in the prior art, wherein due to the load relief slot, a large portion of the limiting strap continues to cover the material of the airbag on the inside so that a heat protection function is simultaneously achieved.

The fastening seam may be formed circumferentially and where applicable, may also be designed as a double seam, wherein the at least one load relief slot is enclosed by the fastening seam. It is thereby ensured that in the region enclosed by the fastening seam, sufficient flexibility and elasticity is provided in the limiting strap in order to prevent the fastening seam from tearing in one section.

In particular in the case of a circumferential arrangement of the fastening seam, it is advantageous when a plurality of load relief slots are provided, which follow the contour of the fastening seam. In principle, in the case of a linear fastening seam, it is also possible and provided that a plurality of load relief slots are disposed one behind the other or beside one another, in order to provide increased elasticity in the fastened limiting strap section or, respectively, at the fastening point.

The fastening point may be formed at a fastening layer, at which at least one limiting strap is formed or fastened. While as a rule, limiting straps have a flat, elongated shape, the fastening point may have a special design that deviates therefrom, for example an enlargement of the width of the limiting strap, so that an enlarged surface is formed in the region of the limiting strap, for example in the end region. This enlarged surface then forms the fastening layer, which is fastened to the airbag material. Enlarging the area of the fastening layer makes it possible to distribute the forces introduced by the limiting strap over a large area in order to reduce load peaks. In addition to the integral design of the fastening point on the limiting strap, it is possible for the fastening point to be formed as a separate component, to which a limiting strap is fastened or a plurality of limiting straps are fastened. Thus the fastening layer can be fastened to the airbag material over a large area and may have special fastening sections for one or a plurality of limiting straps. The fastening layer may be made of a special material that has increased strength and/or heat resistance as compared to the limiting strap or the airbag material, in order to protect the airbag material from an excessive thermal load.

The load relief slot may be disposed in the fastening layer when the limiting strap is affixed via the fastening layer on the front side or on the rear side of the airbag. It is thereby possible to reduce peak loads during deployment by the load relief slots being deformed and a part of the forces being conducted to the deformation of the fastening layer.

The fastening point may also be formed between the fastening layer and the limiting strap, and one of the airbag layers and the fastening layer. The sections of the fastening seam that are located opposite one another may be formed between the fastening seam on the airbag material and the fastening seam on the limiting strap. It is also possible and provided that the load relief slots are disposed in the limiting strap.

The contour of the fastening seam may formed such that it is round or polygonal, wherein it is particularly advantageous when, in the case of a polygonal design, the limiting straps are fastened in the region of the of the linear sections of the polygonal fastening seam in order to be able to implement the introduction of forces over a large area over the entire width of the limiting straps. It is thereby ensured that a large region of the fastening seam having the associated load relief slots or the associated load relief slot makes an elastic deformation possible, as a result of which increased security against the failure of the fastening seam is provided.

The orientation of the load relief slots or of the load relief slot advantageously extends perpendicular to the tensile direction of the limiting strap in order to allow the expansion of the slot or slots, so that sufficient flexibility can be achieved to absorb load peaks.

The load relief slot or the load relief slots may be incised in the fabric of the limiting strap or the fastening element, and likewise it is possible that the load relief slots are cut out of said strap or element and thus, not only is the material of the limiting strap or the fastening element cut through, that material is, in part, removed. The design of the load relief slot as a cut-out makes it possible to achieve an increased degree of elasticity in an orientation that is perpendicular to the longitudinal extension of the slot as well.

BRIEF DESCRIPTION OF THE DRAWINGS

Exemplary embodiments of the invention are described in greater detail below on the basis of the attached figures:

FIG. 1 shows a cross-sectional view through a first embodiment;

FIG. 2 shows a top view of a first fastening variant;

FIG. 3 shows a variant of the embodiment depicted in FIG. 2;

DETAILED DESCRIPTION

Figure 4:
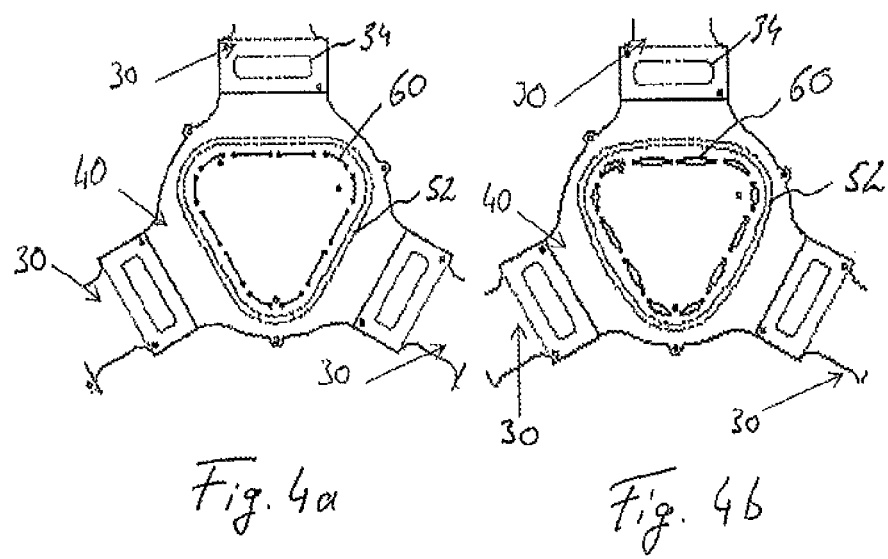
FIGS. 4a and 4b show depictions of a fastening element both before and after deployment.

FIG. 1 shows a cross-sectional view of an airbag 1 having a front side 10 and a rear side 20, which are connected to each other by a circumferential connection seam 12. The front side 10 and the rear side 20 are formed of separate material blanks. A hollow body is formed via the connection seam 12, which is formed as a circumferential seam, which hollow body is filled with deployment gas by a gas generator (not shown here) via a filling port 21. The filling port 21 is disposed on the rear side 20, however it is also possible for the gas generator to be inserted through the opening into the airbag 1 and for the airbag 1 to be affixed to the gas generator. As an alternative to a multi-part design of the airbag 1, the airbag may also be formed one-part, whereby the airbag is then formed as an OPW (one-piece woven) airbag. The side that is facing the vehicle occupant in the event that the airbag is inflated is considered to be the front side 10.

In the depicted exemplary embodiment, two limiting straps 30 are disposed within the volume enclosed by the airbag 1, which limiting straps prevent the airbag 1 from assuming its maximum volume both during and after the filling of the airbag volume. The limiting straps 30 limit the displacement of the front side 10 away from the rear side 20 and thus determine the shape and thus also the volume of the airbag 1.

On the front side 10, the limiting strap 30 is fastened at a first fastening point 31 to a first fastening layer 40 via a first fastening seam 51 having mutually opposing sections, in the case that the fastening point 31 has a round design, with a circumferential first fastening seam 51. The first fastening seam 51 is filled in as a sewn seam, however in principle, it is also possible to select a different type of seam such as a glued or welded seam. The first fastening layer 40, in turn, is sewn to the front side 10 of the airbag 1 via a second fastening seam 51', wherein the second fastening seam 51' is disposed within the sections of the first fastening seam 51 that are located opposite one another. Both fastening seams 51, 51' are formed as double seams. Load relief slots 60 are introduced in the fastening layer 40 between the fastening seams 51, 51' and, in the case of a circumferential design of the fastening seams 51, 51', the load relief slots are introduced into the fastening layer 40 being likewise circumferential, or introduced only in sections. The load relief slots 60 may also be disposed between the seams of the double seam 34.

The limiting strap 30 is fastened to the rear side 20 of the airbag 1 at a second fastening point 32 via a fastening layer 40. As such, the limiting strap 30 is first fastened to a fastening layer 40 via a double seam 34, which fastening layer is formed as a separate component, via a connection seam 34. The fastening layer 40 itself is sewn to the rear side 20 by means of the fastening seam 52. Here it is again possible to use types of seams that differ from the sewn seam. The load relief slots 60 may be disposed in the second fastening layer between the double seam 34 and the fastening seam 52, or between the double seam 34.

Reinforcement layers 41, 42, 43 are disposed further inward on the fastening layer 40, which reinforcement layers 41, 42, 43 are sewn on the rear side 20 to the fastening layer 40 and the rear side 20 via the fastening seam 52.

FIG. 2 shows a top view of a first embodiment of the invention according to FIG. 1, wherein the second fastening point 32 is shown. The limiting strap 30 is sewn onto a T-shaped fastening layer 40 via a connection seam 34 having the shape of an elongated hole. The fastening layer 40 is fastened to the airbag material (not shown here) of the rear side 20 via sections 52, 52' that are located opposite one another via the correspondingly formed fastening seam 52. Three load relief slots 60 are disposed in a line between the two fastening seam sections 52, 52' that extend in a linear direction. The orientation of the load relief slots 60 in the longitudinal extension thereof is perpendicular to the longitudinal extension of the limiting strap 30 and thus is also perpendicular to the primary direction of the forces applied to the fastening layer 40 by the limiting strap 30. The ends of the load relief slots 60 are provided with hole-like openings at the ends, which may be cut out, stamped out, or provided by laser cutting. In this way, the tearing or continued tearing in the longitudinal extension of the load relief slots 60 is prevented.

A variant of the invention is depicted in FIG. 3, wherein a design that essentially corresponds to that shown in FIG. 2 is depicted. Only the fastening seam 52 has a greater width, so that the seam sections 52, 52', which extend parallel to one another, enclose a larger intermediate space. The load relief slots 60, which are disposed within the contour of the fastening seam 52, follow the contour of the fastening seam 52, which has the form of an elongated hole, make a deformation in the fabric within the contour of the fastening seam 52 possible when tensile forces are applied via the limiting strap, as a result of which load peaks are not transferred directly to the fastening seam sections 52, 52', but instead are mitigated by the deformation of the fastening layer 40.

In the case of the two embodiments according to FIGS. 2 and 3, the orientation of the load relief slots 60 is essentially perpendicular to the force transmission. Within the contour of the fastening seam 52, 52', the fabric of the fastening layer 40 or, in the case that the fastening layer is formed as a limiting strap or a direct attachment of the limiting strap to the airbag material, material is still present, which provides the airbag material with a protective effect. The airbag material is placed under a particularly high degree of load, in particular in the region where the limiting strap is attached since, in addition to the forces that are exerted throughout the airbag by the deployment gas, restraining forces are also exerted on the material by the limiting strap 30. The deployment gas, which as a rule is hot, further weakens the strength of the airbag fabric, said weakening being effectively prevented or reduced by the design according to the invention.

FIGS. 4*a* and 4*b* show different depictions both prior to and after the deployment of the airbag. The fastening layer 40 is formed as a separate component, to which three limiting straps 30 are fastened via connection seams 34. The limiting straps 30 are oriented in the shape of a star and are spaced apart from one another equidistantly. The fastening layer 40 is fastened to the airbag (not shown here) via a fastening seam 52, which is designed as a double seam, wherein the contour of the fastening seam 52 is that of a rounded triangle. The side surfaces of the contour extend essentially perpendicular to the longitudinal orientation of the limiting straps 30. A plurality of load relief slots 60 are introduced into the fabric of the fastening seam 40 within the contour of the fastening seam 52, which has a closed design. The material of the fastening layer 40, which, as a rule, is a fabric, is located within the contour of the path of the load relief slots 60.

In FIG. 4*a*, in which the airbag is filled with deployment gas, the edges of the load relief slots 60 that are located opposite one another are adjacent to one another. In FIG. 4*b*, which shows the airbag in a state wherein it is expanded and filled with deployment gas, it can be seen that the load relief slots 60 have expanded due to the tensile forces exerted by the limiting straps 30. Due to the orientation of the load relief slots 60, which is perpendicular to the direction in which the tensile forces are exerted, the width of said load relief slots is expanded so that the load relief slots 60 form an oval shape. The load relief slots 60 provide a ductility and elasticity to the fastening layer 40, as a result of which the loads on the fastening seam 52 are reduced. It is thereby possible to mitigate load peaks and to improve the overall durability of the airbag 1.

Figure 5:
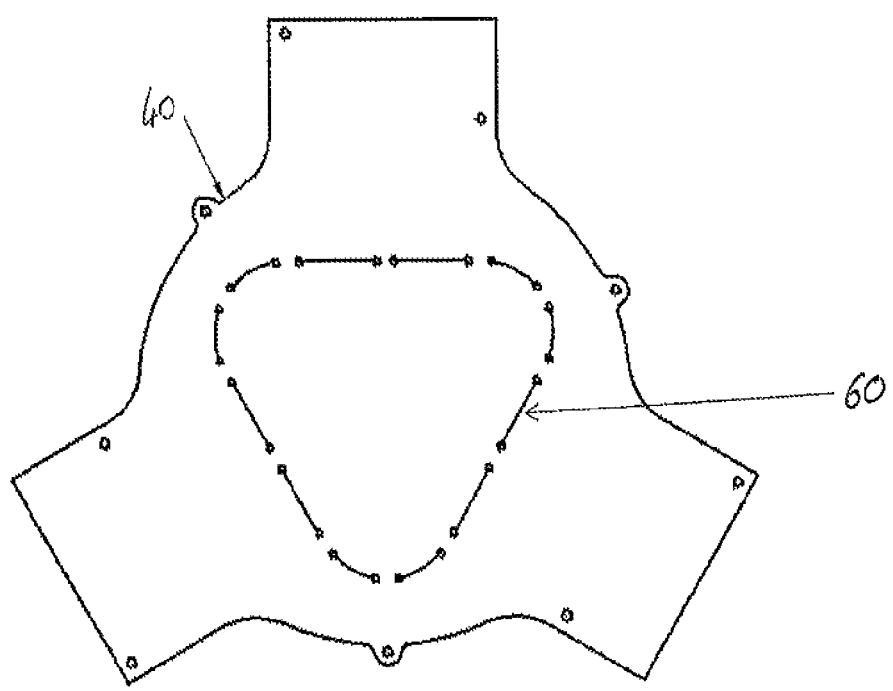
FIG. 5 shows a detailed view of a fastening element.

FIG. 5 shows a detailed view of the fastening layer 40 according to FIG. 4*a* in an as-yet-unattached state. The attachment regions for the limiting straps 30 extend, radiating outward, away from the load relief slots 60, which are disposed in an essentially triangular shape. The material of the fastening layer 40 is still available within the contour of the load relief slots 60 and serves as a heat shield, as explained in FIG. 2. The ends of the load relief slots 60 are provided with circular openings at the ends in order to prevent tearing out or further tearing.

Figure 6:
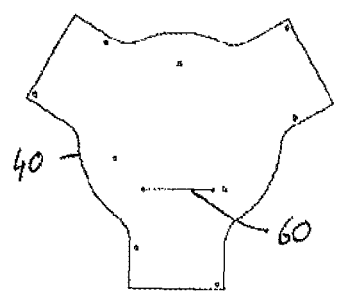
FIGS. 6 through 9 show variants of the embodiment depicted in FIG. 5.

FIG. 6 shows a variant of the invention wherein the fastening layer 40 has only one load relief slot 60. A design of this type is primarily provided when only low forces are expected or a limiting strap 30 is only fastened at the fastening section of the fastening layer 40 associated with the load relief slot 60.

Figure 7:
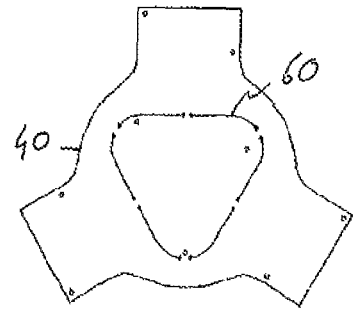

A further embodiment of the invention is shown in FIG. 7, in which, instead of a plurality of smaller, shorter load relief slots on each lateral edge of the contour of the load relief slot path, only two load relief slots 60 are provided. The maximum deformation values can be adjusted along the length of the slots and adapted to the anticipated loads.

Figure 8:
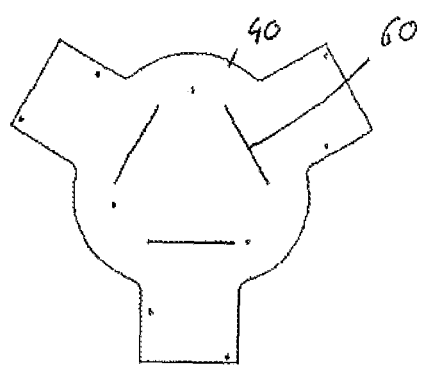

FIG. 8 shows a variant of the embodiment depicted in FIG. 6, in which the three load relief slots 60 are disposed opposite the respective fastening sections of the fastening layer 40. By designing only one of the load relief slot 60 in a linear configuration, it is possible to achieve a high degree of deformation in the fastening layer 40.

Figure 9:
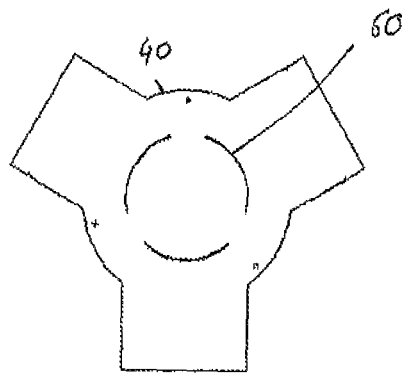

FIG. 9 depicts a variation of FIG. 8 wherein, instead of linear load relief slots 60, curved load relief slots 60 are provided, which are disposed opposite the respective fastening sections of the fastening layer 40 for the limiting straps. Overall the contour of the load relief slots 60 according to FIG. 9 has a circular shape so that a circular fastening seam may also be provided.

Figure 10:
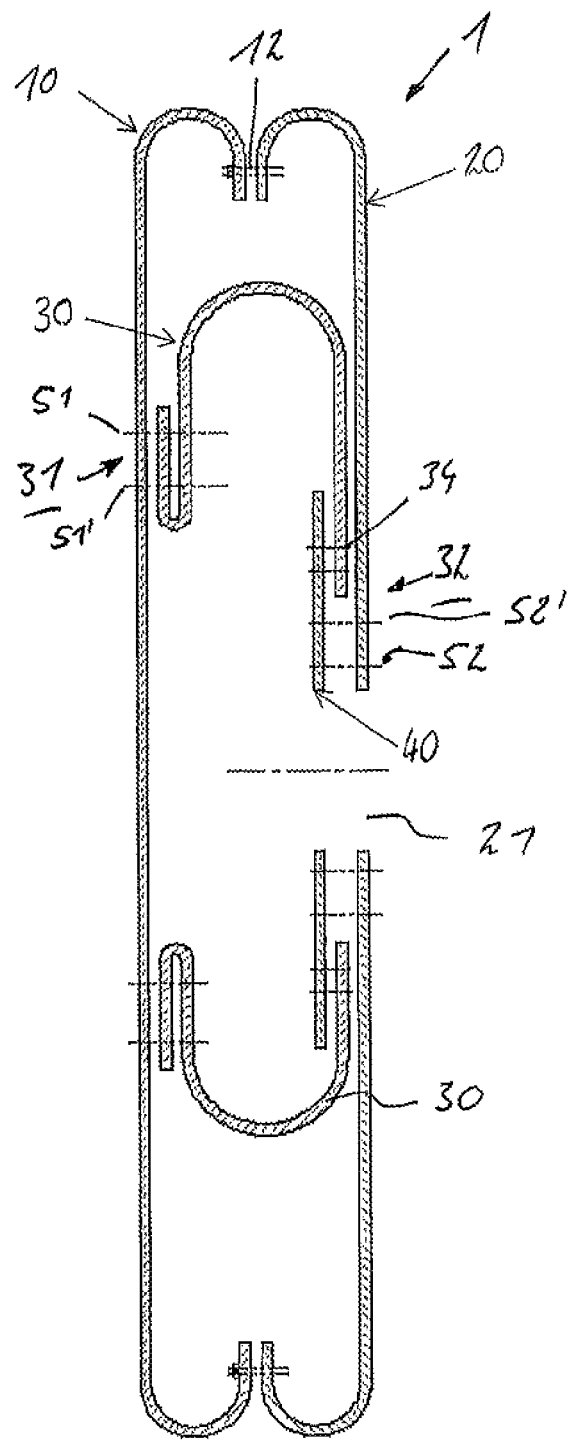
FIG. 10 shows a variant of the embodiment depicted in FIG. 1.

FIG. 10 shows a variant of the invention, which essentially corresponds to the embodiment according to FIG. 1. Identical reference numbers are used for identical parts. Instead of fastening the limiting strap 30 to the front side 10 by means of a front fastening layer 40, the limiting strap 30 is fastened directly to the front side 10 at a first fastening point 31 via a fastening seam 51, 51' having mutually opposing sections. The fastening seam 51, 51' is filled in as a sewn seam, however in principle, it is also possible to select a different type of seam such as a glued or welded seam. The front end of the limiting strap 30 is folded over, thereby creating a doubling of the material. The attachment may be formed without load relief slots or with load relief slots, wherein the load relief slots may be formed between the two fastening seams 51, 51' in the limiting strap 30. Due to the doubling of the material, sufficient stability in the limiting strap 30 and the fastening point 31 is ensured.

The limiting strap 30 is fastened to the rear side 20 of the airbag 1 at a second fastening point 32 via a fastening layer 40. To this end, a limiting strap 30 is fastened via a double seam 34 first to a fastening layer 40, which is formed as a separate component, via a connection seam 34. The fastening layer 40 itself is sewn to the rear side 20 by means of the fastening seam 52, 52'. Here, it is again possible to use types of seams that differ from the sewn seam. The load relief slots 60 may be disposed between the double seam 34 and the fastening seams 52, 52' in order to provide sufficient elasticity in the event that the airbag is deployed, and in order to reduce the load on the fastening seams 52, 52'.

While the above description constitutes the preferred embodiment of the present invention, it will be appreciated that the invention is susceptible to modification, variation and change without departing from the proper scope and fair meaning of the accompanying claims.

The invention claimed is:

1. An airbag having a front side and a rear side connected thereto, the airbag is made of an airbag material, which encloses a volume that is filled with a deployment gas when a gas generator or a pressurized-gas source is activated, comprising, at least one limiting strap, which is connected to the front side at a first fastening point, and to the rear side at a second fastening point, the limiting strap limiting the displacement between the front side with respect to the rear side upon inflation of the airbag by the deployment gas, at least one of the first and second fastening points having a fastening seam having mutually opposing sections for fastening the limiting strap to the airbag material, and wherein at least one load relief slot within the volume is adjacent to the fastening point between the opposing sections of the fastening seam, the relief slot providing elasticity to the connection between the limiting strap and the airbag material in order to reduce a load on the airbag material and on the fastening seam upon inflation of the airbag.

2. An airbag according to claim 1 wherein the fastening seam is formed circumferentially, and wherein the load relief slot is enclosed by the fastening seam.

3. An airbag according to claim 1 wherein a plurality of the load relief slots is provided, which follow the contour of the fastening seam.

4. An airbag according to claim 1 wherein at least one of the first and the second fastening points is formed at a fastening layer, at which the limiting strap is formed or attached.

5. An airbag according to claim 4 wherein a plurality of the limiting straps are sewn at the fastening layer.

6. An airbag according to claim 4 wherein the load relief slot is disposed in the fastening layer.

7. An airbag according to claim 1 wherein the contour of the fastening seam is formed such that the contour is round or polygonal.

8. An airbag according claim 1 wherein the orientation of the load relief slot is perpendicular to a tensile direction of the limiting strap.

9. An airbag according to claim 1 wherein the load relief slot is incised or cut out.

10. An airbag according to claim 4 wherein the limiting strap extends radially from the fastening layer.

11. An airbag having a front side and a rear side connected thereto, the airbag is made of an airbag material, which encloses a volume that is filled with a deployment gas when a gas generator or a pressurized-gas source is activated, comprising, at least one limiting strap, which is connected to the front side at a first fastening point, and to the rear side at a second fastening point, at least one of the first and the second fastening points having a fastening seam having mutually opposing sections for fastening the limiting strap to the airbag material, and wherein plurality of load relief slots are provided adjacent to the fastening points between the opposing sections of the fastening seam and which follow the contour of the fastening seam.

* * * * *